United States Patent
Ogawa

(10) Patent No.: US 7,471,047 B2
(45) Date of Patent: Dec. 30, 2008

(54) PLASMA TELEVISION SET

(75) Inventor: Takahiro Ogawa, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 407 days.

(21) Appl. No.: 11/442,412

(22) Filed: May 25, 2006

(65) Prior Publication Data

US 2006/0214599 A1 Sep. 28, 2006

(30) Foreign Application Priority Data

Jun. 1, 2005 (JP) ............ 2005-003951 U

(51) Int. Cl.
G09G 3/10 (2006.01)
(52) U.S. Cl. ............. 315/169.4; 315/291; 345/212; 345/211; 323/282; 323/298; 361/91.1; 361/93.9; 348/372
(58) Field of Classification Search ........... 315/169.4, 315/169.1, 291, 307; 345/210–212; 323/282, 323/285, 298; 361/91.1, 91.2, 93.9; 348/372, 348/E5.127, E17.005
See application file for complete search history.

(56) References Cited

U.S. PATENT DOCUMENTS

| | | | | |
|---|---|---|---|---|
| 5,436,635 A * | 7/1995 | Takahara et al. | ............... | 345/92 |
| 5,583,424 A * | 12/1996 | Sato et al. | ............... | 323/282 |
| 2007/0146949 A1* | 6/2007 | Nishimura | ............... | 361/90 |
| 2008/0030142 A1* | 2/2008 | Jinno et al. | ............... | 315/169.4 |
| 2008/0068367 A1* | 3/2008 | Ogawa | ............... | 345/211 |

FOREIGN PATENT DOCUMENTS

| | | |
|---|---|---|
| JP | 06-332401 | 12/1994 |
| JP | 07-104711 | 4/1995 |
| JP | 08-101661 | 4/1996 |
| JP | 10-026955 | 1/1998 |
| JP | 2001-013917 | 1/2001 |
| JP | 2001-211638 | 8/2001 |
| JP | 2001-333574 | 11/2001 |
| JP | 2002-136109 | 5/2002 |
| JP | 2002-149080 | 5/2002 |
| JP | 2002-153056 | 5/2002 |

* cited by examiner

*Primary Examiner*—Haissa Philogene
(74) *Attorney, Agent, or Firm*—Yokoi & Co., U.S.A., Inc.; Peter Ganjian

(57) ABSTRACT

At a primary power-supply board 40, a $V_{sus}$ power supply and a $V_{add}$ power supply of prescribed voltages are derived and outputted to a plasma display panel 11. Secondary power supplies $V_{sub1}$, $V_{sub2}$, and $V_{sub3}$ are derived from prescribed voltage levels of a transformer 42 for deriving $V_{sus}$ and $V_{add}$ power supplies at the primary power-supply board 40. The secondary power supplies $V_{sub1}$, $V_{sub2}$, and $V_{sub3}$ are outputted to a secondary power-supply board 20 which is a board different from the primary power-supply board 40. $V_{set}$, $V_e$, and $V_{scan}$ power supplies which can be used by the plasma display panel 11 are derived by regulating the secondary power supplies $V_{sub1}$, $V_{sub2}$, and $V_{sub3}$. Thus, since the primary power-supply board 40 and the secondary power-supply board 20 are provided separately, the secondary power-supply board 20 alone can be replaced to cope with the changes of the plasma display panel 11.

5 Claims, 4 Drawing Sheets

PLASMA TELEVISION SET

CROSS-REFERENCES TO RELATED APPLICATIONS

The present application is related to the Japanese Utility Model Application No. 2005-3951, filed Jun. 1, 2005, the entire disclosure of which is expressly incorporated by reference herein.

BACKGROUND OF THE INVENTION (1) Field of the Invention

The present invention relates to a plasma television set.

(2) Description of the Related Art

As a plasma display panel has a plurality of electrodes, it requires a plurality of power supplies of different voltages. Therefore, a plasma television set with a plasma display panel requires a power-supply circuit wherein a plurality of power supplies are formed. If a plurality of power supplies are formed individually in a power-supply circuit, the power-supply circuit requires a large number of parts, is costly, and cannot be compact. On the other hand, disclosed in Japanese Unexamined Patent Publication Nos. H6-332401 and 2001-13917 are arts for a plurality of power supplies to share part of a power-supply circuit with one another.

According to the above prior arts, a plurality of power supplies share electronic parts, a circuit board, etc.; therefore, the production cost of the power-supply circuit is relatively low and it can be relatively compact.

However, the plasma display panels of different manufacturers or different models of plasma display panels require different voltages; therefore, each time plasma display panels are changed, the entire power-supply circuit has to be changed, increasing the production cost. Besides, each time plasma display panels are changed, the arrangement of parts has to be changed in the production line, reducing the production efficiency.

BRIEF SUMMARY OF THE INVENTION

In view of the above problems, the present invention is intended to provide a plasma television set capable of coping flexibly with the changes of specifications of power supplies of its plasma display panel.

One aspect of the present invention provide a plasma television set having a plasma display panel driven by a plurality of direct-current power supplies including at least an address power supply and a sustain power supply, said plasma television set comprising a primary power-supply board and a secondary power-supply board, said primary power-supply board including: a rectifier circuit for converting an alternating-current power supply to a direct-current power supply; a transformer for deriving address and sustaining power supplies of prescribed voltages from said direct-current power supply, primary power-supply board output terminals for outputting said address and sustaining power supplies to said plasma display panel; and terminals for the secondary power-supply board for outputting secondary power supplies derived from prescribed voltage levels of said transformer to the secondary power-supply board, said secondary power-supply board being independent of said primary power-supply board and including: voltage-regulator circuits for regulating said secondary power supplies inputted through said terminals for the secondary power-supply board and outputting them to said plasma display panel.

With the above configuration, the plasma display panel is driven by a plurality of direct-current power supplies including at least the address and the sustaining power supply. The plasma display panel has many cells, each provided with a plurality of electrodes, and electric discharge occurs between the electrodes of every cell to display pictures. It is, therefore, necessary to feed a direct-current power supply of a prescribed voltage to each electrode. In the case of a plasma display panel of a surface-discharge type, an address power supply is fed to the address electrodes for causing pre-discharge at each cell and a sustaining power supply is fed to the sustaining electrodes for causing discharge along the panel surface at each cell.

The primary power-supply board is provided with the rectifier circuit, the transformer, the primary power-supply board output terminals, and the terminals for the secondary power-supply board. The rectifier circuit converts an alternating-current power supply to a direct-current power supply, and the transformer derives an address and a sustaining power supply of prescribed voltages from the direct-current power supply. The derived address and sustaining power supplies are outputted through the primary power-supply board output terminals to the plasma display panel. On the other hand, secondary power supplies derived from prescribed voltage levels of the transformer are outputted through the terminals for the secondary power-supply board to the secondary power-supply board.

The secondary power-supply board is independent of the above primary power-supply board and is provided with voltage-regulator circuits. The secondary power supplies are fed to the voltage-regulator circuits through the terminals for the secondary power-supply board. The voltage-regulator circuits regulate the secondary power supplies and output them to the plasma display panel. Thus, the address, sustaining, and secondary power supplies are fed to the plasma display panel.

As described above, a plasma television set capable of coping flexibly with the changes of specifications of power supplies of its plasma display panel is provided according to the present invention.

An optional aspect of the present invention provides a plasma television set, wherein said voltage-regulator circuit includes: a MOSFET which is fed with said secondary power supply through its drain and outputs said secondary power supply through its source to said plasma display panel; a capacitor put between the source and the ground of said MOSFET; a variable resistor put between the source and the ground of said MOSFET; a shunt regulator into which a divided voltage from the voltage of said secondary power supply divided by said variable resistor is inputted as a reference voltage; and a regulating transistor which reduces the gate voltage of said MOSFET when said shunt regulator is turned on.

With the above configuration, each voltage-regulator circuit is provided with the MOSFET, the capacitor, the variable resistor, the shunt regulator, and the regulating transistor. Inputted into the drain of the MOSFET is a secondary power supply outputted from the terminal for the secondary power-supply board of the primary power-supply board. Then, the secondary power supply is outputted from the source of the MOSFET to the plasma display panel. Thus, the voltages of the secondary power supplies to be outputted to the plasma display panel are regulated in accordance with the gate voltages of the MOSFETs.

The capacitor is put between the source and the ground of the MOSFET so as to smooth the secondary power supply to be outputted to the plasma display panel. The variable resistor is put between the source and the ground of the MOSFET and in parallel with the capacitor so as to divide the voltage of the secondary power supply. The divided voltage from the voltage of the secondary power supply divided by the variable resistor is inputted as a reference voltage into the shunt regulator. If the divided voltage from the voltage of the secondary power supply is higher than the reference voltage of the shunt regulator, the shunt regulator is turned on and the regulating transistor operates to reduce the gate voltage of the MOSFET. Thus, if the voltage of the secondary power supply outputted from the source of the MOSFET is high and the above divided voltage is high, the voltage of the secondary power supply to be outputted from the source of the MOSFET is reduced. Because the ratio of the above divided voltage to the voltage of the secondary power supply can be changed by adjusting the variable resistor, the voltage of the secondary power supply to be outputted from the source of the MOSFET can be adjusted to any desired voltage level.

With the above voltage-regulator circuits, the voltages of the secondary power supplies to be outputted to the plasma display panel can be stabilized at any desired levels.

Another optional aspect of the present invention provides a plasma television set, wherein each of said voltage-regulator circuits includes a starting transistor which a start signal inputted from a microcomputer is inputted into and reduces said gate voltage while no start signal is inputted into it.

With the above configuration, each voltage-regulator circuit is provided with the starting transistor which a start signal outputted from a microcomputer is inputted into and reduces the above gate voltage while no start signal is inputted into it. Thus, the secondary power supplies are controlled so that they will be inputted into the plasma display panel only while a start signal is inputted into the starting transistors.

Thus, the secondary power supplies can be turned on and off by using a microcomputer.

Another optional aspect of the present invention provides a plasma television set according to claim 4, wherein each of said voltage-regulator circuits includes a limiting transistor which reduces said gate voltage if an overcurrent is detected at the source of said MOSFET.

With the above configuration of the present embodiment, each voltage-regulator circuit is provided with the limiting transistor which reduces the above gate voltage if an overcurrent is detected at the source of its MOSFET. Thus, the secondary power supplies are controlled so that they will not be outputted to the plasma display panel if an overcurrent is detected at the source of the MOSFET.

Thus, devices are protected from overcurrents.

More specifically, Another aspect of the present invention provides a plasma television set having a plasma display panel driven by a plurality of direct-current power supplies including at least an address power supply and a sustain power supply, said plasma television set comprising a primary power-supply board and a secondary power-supply board, said primary power-supply board including: a rectifier circuit for converting an alternating-current power supply to an direct-current power supply; a transformer for deriving address and sustaining power supplies of prescribed voltages from said direct-current power supply; primary power-supply board output terminals for outputting said address and sustaining power supplies to said plasma display panel; and terminals for the second power-supply board for outputting secondary power supplies derived from prescribed voltage levels of said transformer to the secondary power-supply board, said secondary power-supply board being independent of said primary power-supply board and including: input terminals connectable to said terminals for the secondary power-supply board; MOSFETs which are fed with said secondary power supplies through their drains and output said secondary power supplies through their sources to said plasma display panel; capacitors put between the source and the grounds of said MOSFETs; variable resistors put between the sources and the grounds of said MOSFETs; shunt regulators into which divided voltages from the voltages of said secondary power supplies divided by said variable resistors are inputted as reference voltages; regulating transistors which reduce the gate voltages of said MOSFETs when said shunt regulators are turned on; starting transistors which a start signal outputted from a microcomputer is inputted into and reduce said gate voltages while no start signal is inputted into them; limiting transistors which reduce said gate voltages if overcurrents are detected at the sources of said MOSFETs; and secondary power-supply board output terminals for electrically connecting the sources of said MOSFETs to said plasma display panel.

With the above more specific configuration, the same effect can be achieved as the effect which can be achieved with the other configurations described earlier.

These and other features, aspects, and advantages of the invention will be apparent to those skilled in the art from the following detailed description of the preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character (s) present corresponding parts throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Embodiments of the present invention will be described below in the following order.

Figure 1:
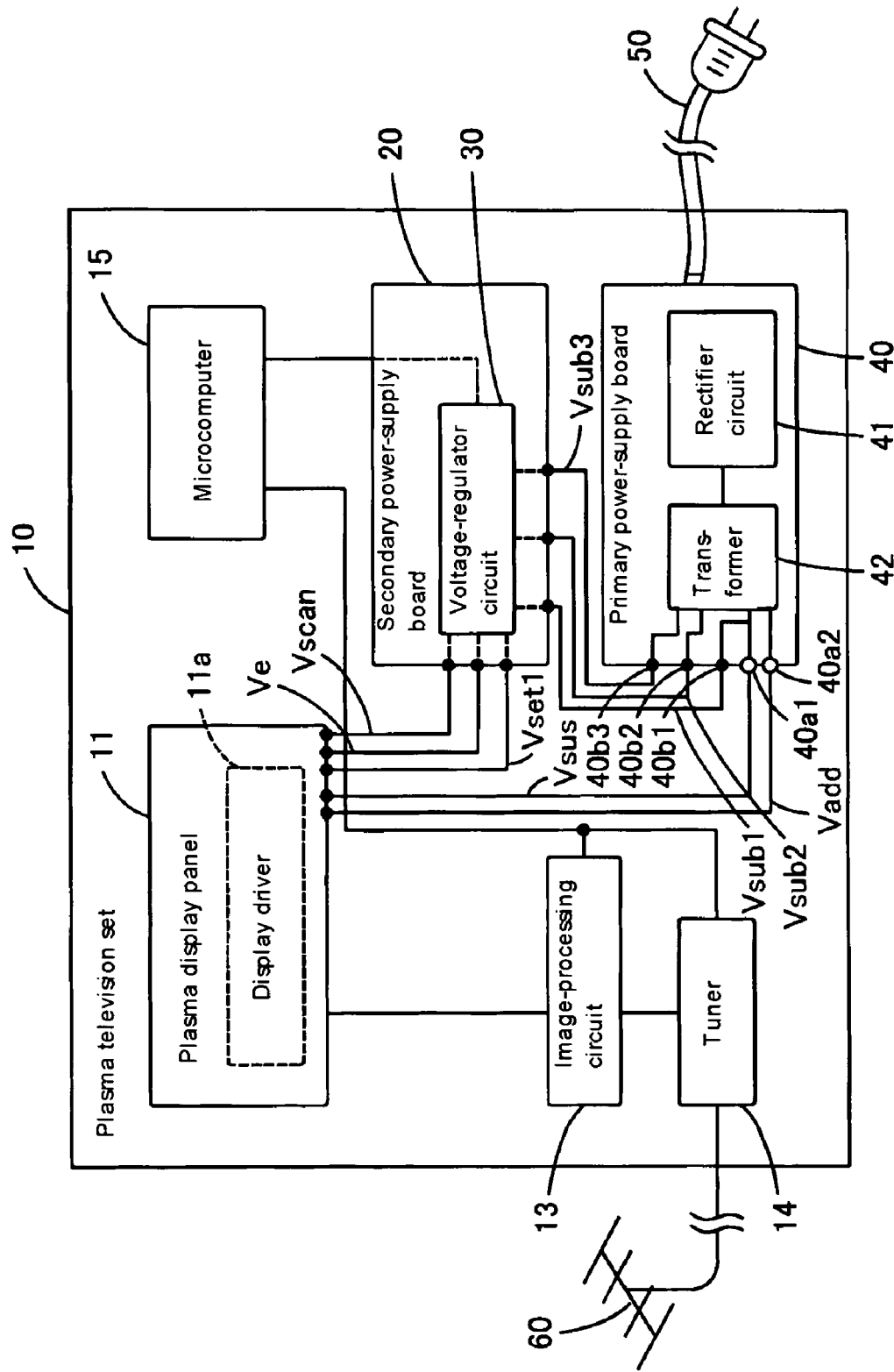
FIG. 1 is an exemplary illustration of a block diagram of a plasma television set.

(1) Configuration of plasma television set
(2) Configuration of primary power-supply board
(3) Configuration of secondary power-supply board
(4) Summary (1) Configuration of Plasma Television Set FIG. 1 is a block diagram of a plasma television set according to an embodiment of the present invention. The plasma television set 10 comprises a plasma display panel 11, an image-processing circuit 13, a tuner 14, a microcomputer 15, a secondary power-supply board 20, and a primary power-supply board 40. TV electric waves are inputted into the tuner 14 through an antenna 60, and the tuner 14 extracts video signals, etc. from the TV electric waves of a frequency band designated by the microcomputer 15.

The image-processing circuit 13 produces digital video signals based on the video signals inputted from the tuner 14. The digital video signals are inputted into a display driver 11a, which produces driving signals to drive the plasma display panel 11. With the above configuration, pictures based on TV electric waves can be reproduced by the plasma display panel 11. Not only TV pictures received by the antenna 60 but also TV pictures of community antenna television may be reproduced. Besides, pictures inputted from an external device such as a DVD drive may be reproduced. It will do if the image-processing circuit 13 is capable of processing video signals of such video formats. Either digital or analog TV electric waves may be inputted into the tuner 14.

Inputted from the primary power-supply board 40 into the plasma display panel 11 are a $V_{sus}$ power supply (sustaining power supply) and a $V_{add}$ power supply (address power supply). Inputted from the secondary power-supply board 20 into the plasma display panel 11 are secondary power supplies; i.e., a $V_{set}$ power supply, a $V_e$ power supply, and a $V_{scan}$ power supply (scanning power supply). The $V_{sus}$, $V_{add}$, and $V_{scan}$ power supplies are fed to the sustaining, address, and scanning electrodes of cells of the plasma display panel 11. The plasma display panel 11 is of a surface-discharge type: the address electrodes cause pre-discharge at cells and a pulse voltage is applied between the scanning and sustaining electrodes of those cells to cause discharge along the surface of the plasma display panel 11. The $V_{set}$ and $V_e$ power supplies are to eliminate the residual electric charge of cells.

The most desired voltage of the $V_{sus}$ power supply is 205 V, and the allowable range of the voltage is 180-220 V. The most desired voltage of the $V_{add}$ power supply is 65 V, and the allowable range of the voltage is 52-72 V. The most desired voltage of the $V_{set}$ power supply is 175 V, and the allowable range of the voltage is 175-195 V. The most desired voltage of the $V_e$ power supply is 85 V, and the allowable range of the voltage is 75-115 V. The most desired voltage of the $V_{scan}$ power supply is −220 V, and the allowable range of the voltage is −190 to −220 V.

A domestic alternating-current power supply is fed to the primary power-supply board 40 of the plasma television set 10 through a power cable 50. A rectifier circuit 41 converts the alternating-current power supply to a direct-current power supply, and a $V_{sus}$ power supply and a $V_{add}$ power supply are formed while insulated by a transformer 42. The $V_{sus}$ and $V_{add}$ power supplies are outputted through output terminals 40a1 and 40a2 to the plasma display panel 11. Derived from the transformer 42 are three secondary power supplies $V_{sub1}$, $V_{sub2}$, and $V_{sub3}$, which are outputted through output terminals 40b1, 40b2, and 40b3 to the secondary power-supply board 20. The secondary power supply $V_{sub1}$ branches off from the $V_{sus}$ power supply.

(2) Configuration of Primary Power-supply Board

Figure 2:
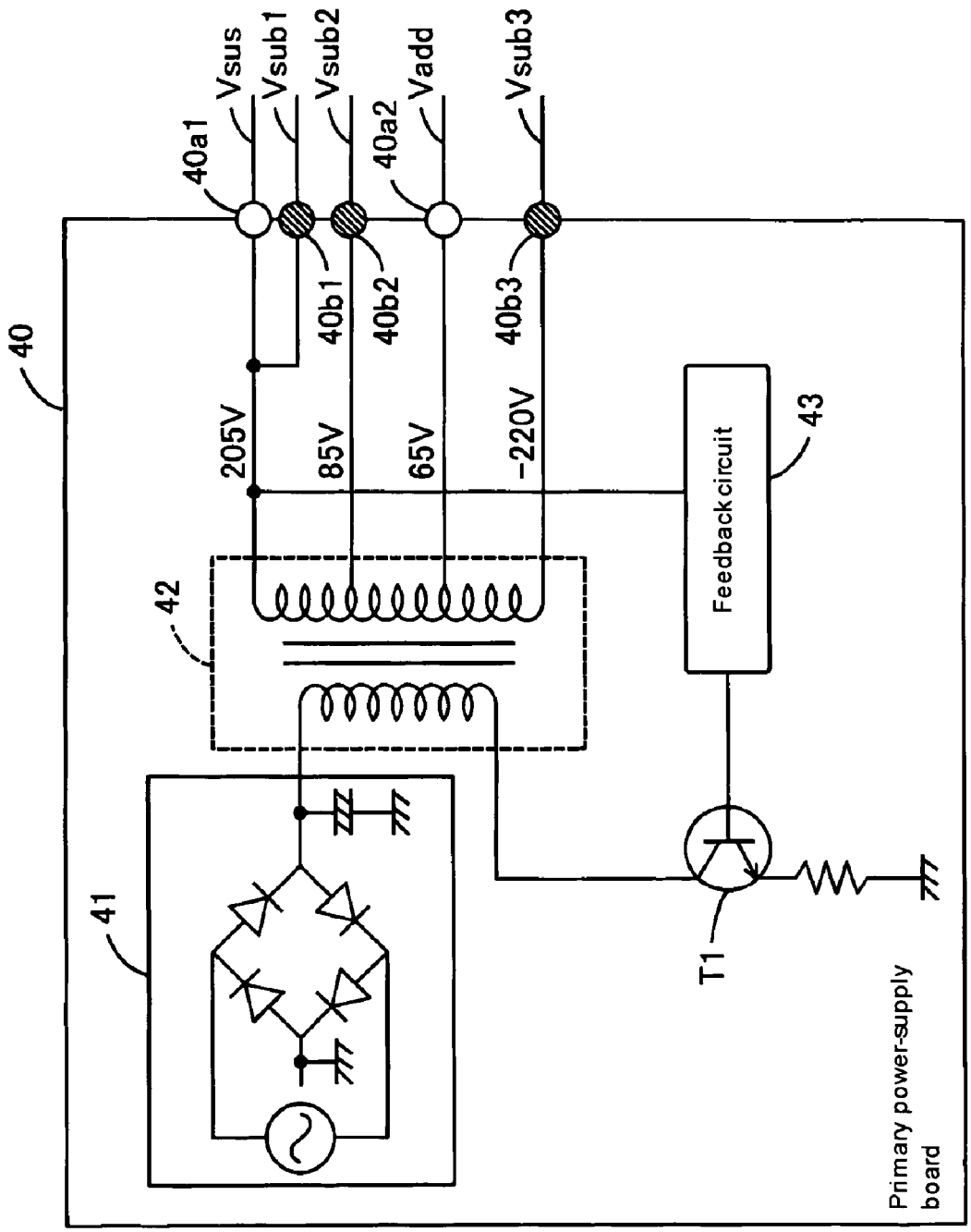
FIG. 2 is an exemplary illustration of a circuit diagram of a primary power-supply board.

FIG. 2 is a circuit diagram of the primary power-supply board 40. The direct-current power supply after rectification by the rectifier circuit 41 with a rectifying bridge is inputted into one end of the primary winding of the transformer 42, and the other end of the primary winding is connected to the collector of a switching transistor T1. Accordingly, the secondary voltage of the transformer 42 is regulated in accordance with the duty ratio of the base current of the switching transistor T1. The base current of the switching transistor T1 is produced by a feedback circuit 43 which monitors the secondary voltage of the transformer 42. If the secondary voltage of the transformer 42 rises, the feedback circuit 43 reduces the duty ratio of the base current of the switching transistor T1. If the secondary voltage of the transformer 42 lowers, the feedback circuit 43 raises the duty ratio of the base current of the switching transistor T1. Thus, the secondary voltage of the transformer 42 is stabilized.

The primary and secondary sides of the transformer 42 are insulated from each other, and the primary and secondary sides of the feedback circuit 43 are insulated from each other by a photo-coupler, too. Thus, if an abnormal power supply is inputted, the secondary sides are protected.

Four lead wires are connected to four different points of the secondary winding of the transformer 42. The voltages of the four lead wires are different from one another as shown in FIG. 2. The voltage of the first lead wire is about 205 V and the first lead wire is connected to the output terminals 40a1 and 40b1. As shown in FIG. 1, the secondary voltage of about 205 V is outputted as a $V_{sus}$ power supply through the output terminal 40a1 to the plasma display panel 11 and the secondary voltage of about 205 V is outputted as a secondary power supply $V_{sub1}$ through the output terminal 40b1 to the secondary power-supply board 20.

The voltage of the second lead wire is about 85 V and the second lead wire is connected to the output terminal 40b2. The secondary voltage of about 85 V is outputted as a secondary power supply $V_{sub2}$ through the output terminal 40b2 to the secondary power-supply board 20. The voltage of the third lead wire is about 65 V and the third lead wire is connected to the output terminals 40a2. The secondary voltage of about 65 V is outputted as a $V_{add}$ power supply through the output terminal 40a2 to the plasma display panel 11. The voltage of the fourth lead wire is about −220 V and the fourth lead wire is connected to the output terminals 40b3. The secondary voltage of about −220 V is outputted as a secondary power supply $V_{sub3}$ through the output terminal 40b3 to the secondary power-supply board 20.

Figure 3:
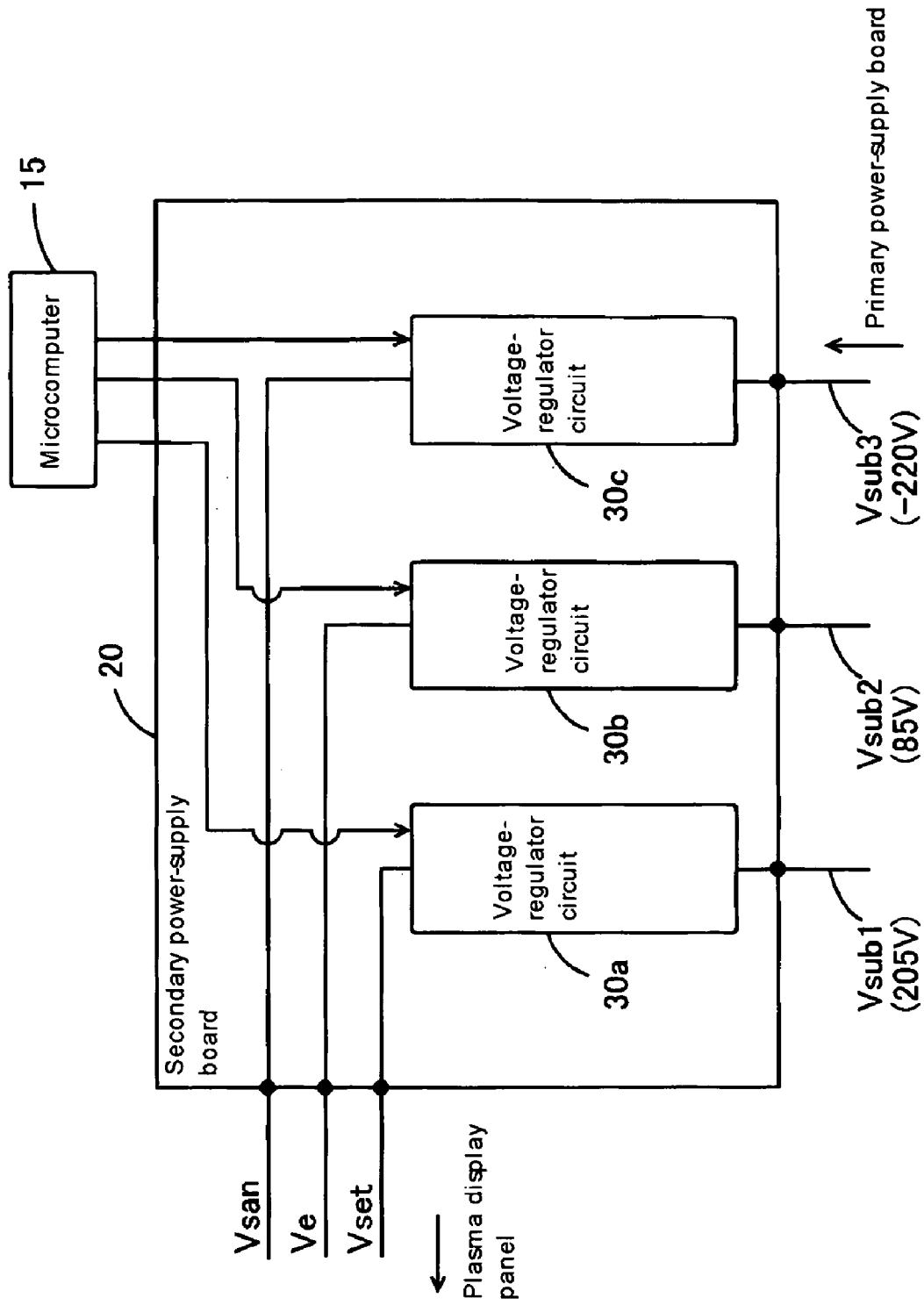
FIG. 3 is an exemplary illustration of a block diagram of a secondary power-supply board.

With the above configuration, the $V_{sus}$ power supply of about 205 V and the $V_{add}$ power supply of about 65 V are fed to the plasma display panel 11 so as to cause discharge between the electrodes of cells. On the other hand, the secondary power supply $V_{sub1}$ of about 205 V, the secondary power supply $V_{sub2}$ of about 85 V, and the secondary power supply $V_{sub3}$ of about −220 V are fed to the secondary power-supply board 20. The transformer may have four secondary windings, instead of one, to be connected to the four lead wires, respectively (3) Configuration of Secondary Power-supply Board FIG. 3 is a block diagram of the secondary power-supply board 20. There are provided three voltage-regulator circuits 30a, 30b, and 30c for the three secondary power supplies $V_{sub1}$, $V_{sub2}$, and $V_{sub3}$ inputted to the secondary power-supply board 20 from the primary power-supply board 40. The secondary power supply $V_{sub1}$ of about 205 V is inputted into the voltage-regulator circuit 30a, which feeds a $V_{set}$ power supply of about 175 V to the plasma display panel 11. The secondary power supply $V_{sub2}$ of about 85 V is inputted into the voltage-regulator circuit 30b, which feeds a $V_e$ power supply of about 85 V to the plasma display panel 11. The secondary power supply $V_{sub3}$ of about −220 V is inputted into the voltage-regulator circuit 30c, which feeds a $V_{scan}$ power supply of about −220 V to the plasma display panel 11. The voltage-regulator circuits 30a, 30b, and 30c will be described in detail below. If connectors for the secondary power supplies $V_{sub1}$, $V_{sub2}$, and $V_{sub3}$ are provided between the primary and secondary power-supply boards 40 and 20, connection can be made easily. Accordingly, the specifications of the secondary power supplies $V_{sub1}$, $V_{sub2}$, and $V_{sub3}$ can be changed easily.

Figure 4:
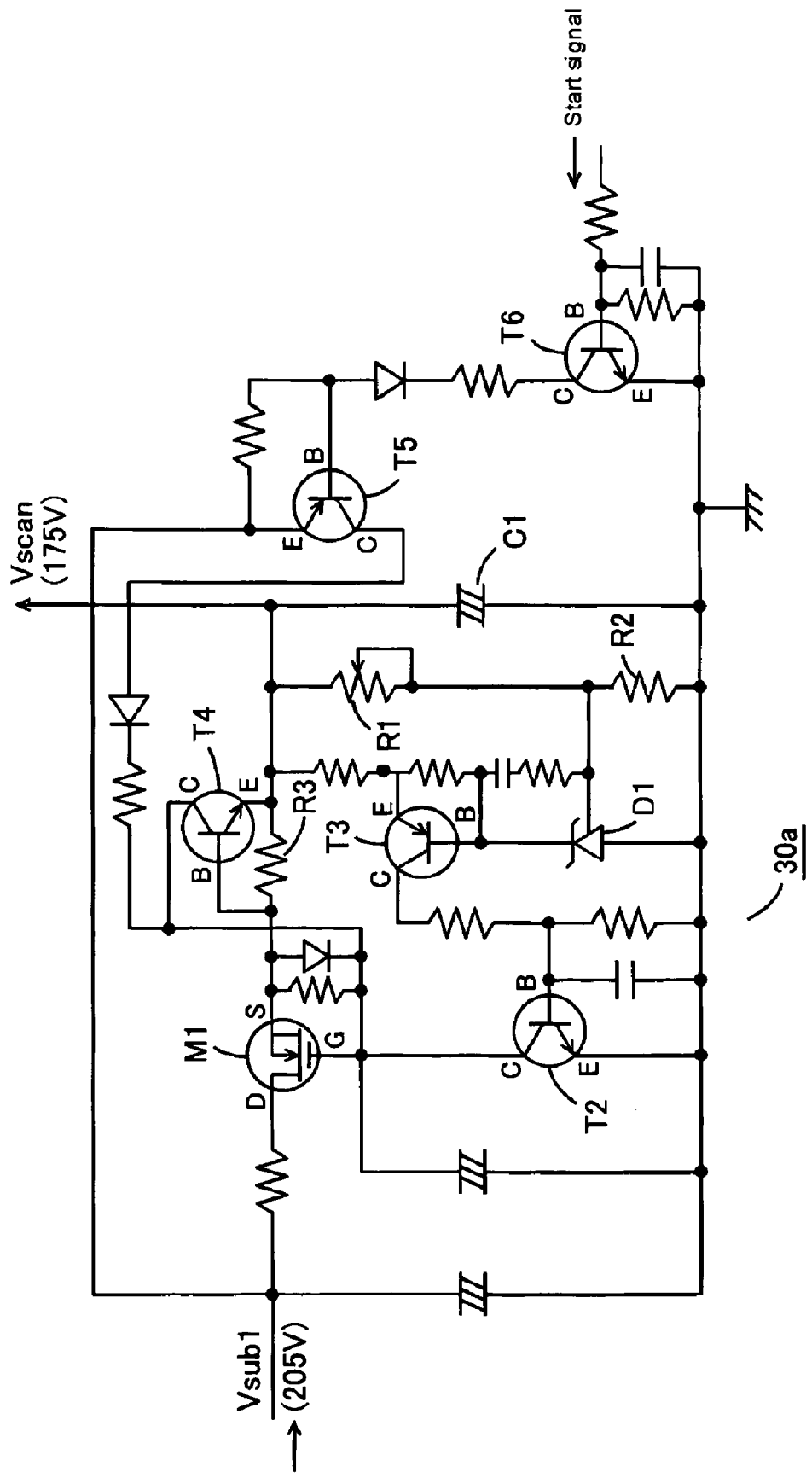
FIG. 4 is an exemplary illustration of a circuit diagram of a voltage-regulator circuit.

FIG. 4 is a circuit diagram of the voltage-regulator circuit 30a. The voltage-regulator circuits 30b and 30c have the same configuration as the voltage-regulator circuit 30a. The voltage-regulator circuit 30a has a MOSFET "M1," and the secondary power supply $V_{sub1}$ is fed to the drain of the MOSFET "M1." Besides, the secondary DC power supply $V_{sub1}$ is fed to the gate of the MOSFET "M1" through the emitter and collector of a transistor "T5." The base of the transistor "T5" is grounded through the collector and emitter of the transistor "T6." A start signal is inputted from a microcomputer 15 into the base of the transistor "T6." Therefore, when a plus start signal is inputted from the microcomputer 15 into the base of the transistor "T6," electric currents occur between the collector and emitter of the transistor "T6" and through the base of the transistor "T5."

At this time, a high voltage can be applied to the gate of the MOSFET "M1" through the emitter and collector of the transistor "T5." Therefore, while a plus start signal is inputted from the microcomputer 15 into the base of the transistor "T6," a high gate voltage can be applied to the gate of the MOSFET "M1" so that a direct-current power supply will be outputted from the source of the MOSFET "M1." The direct-current power supply outputted from the source of the MOSFET "M1" is fed, as a $V_{scan}$ power supply, to the plasma display panel 11. Because the source of the MOSFET "M1" is grounded through an electrolytic capacitor "C1," the voltage of the $V_{scan}$ power supply of the MOSFET "M1" is smoothed by the charge and discharge function of the electrolytic capacitor "C1." On the other hand, while a plus start signal is not inputted from the microcomputer 15 into the base of the transistor "T6," a high voltage is not applied to the gate of the MOSFET "M1." Therefore, no direct-current power supply is outputted from the source of the MOSFET "M1."

Namely, a $V_{scan}$ power supply is outputted to the plasma display panel 11 while a start signal is outputted from the microcomputer 15, whereas a $V_{scan}$ power supply is not outputted to the plasma display panel 11 while a start signal is not outputted from the microcomputer 15. Thus, the output of a $V_{scan}$ power supply to the plasma display panel 11 can timely be controlled by using the microcomputer 15. Incidentally, because the transistors "T5" and "T6" reduce the gate voltage of the MOSFET "M1" when a start signal is inputted, they are equivalent to the "starting transistor" of the present invention.

Also, the collector of the transistor "T4" is connected to the gate of the MOSFET "M1." A resistor "R3" is put between the base and emitter of the transistor "T4" in parallel, and the source of the MOSFET "M1" is also connected to the resistor "R3." If an overcurrent occurs at the source of the MOSFET "M1," high voltages are applied to both ends of the resistor "R3" and electric currents occur through the base of the transistor "T4." Then, the resistance between the collector and emitter of the transistor "T4" is lowered, and the gate voltage of the MOSFET "M1" is reduced as low as the level of the voltage at one end of the resistor "R3." Accordingly, a $V_{scan}$ power supply from the source of the MOSFET "M1" is not outputted. Namely, no $V_{scan}$ power supply is outputted while the overcurrent occurs at the source of the MOSFET "M1." Thus, the overcurrent is prevented from flowing into the plasma display panel 11 and other devices as the $V_{scan}$ power supply and damaging them. Incidentally, because the transistor "T4" reduces the gate voltage of the MOSFET "M1" when an overcurrent is detected at the source of the MOSFET "M1," it is equivalent to the "limiting transistor" of the present invention.

Further, the gate of the MOSFET "M1" is grounded through the emitter and collector of the transistor "T2." The collector of the transistor "T3" is connected to the base of the transistor "T2." The base of the transistor "T3" is connected with a cathode of the shunt regulator "D1" whose anode is grounded. Further, divided voltages from the source voltage of the MOSFET "M1" divided by the variable resistor "R1" and fixed resistor "R2" are inputted to reference terminals of the shunt regulator "D1." Also, the emitter of the transistor "T3" is raised so as to achieve a prescribed voltage level by making use of the source voltage of the MOSFET "M1."

When the source voltage of the MOSFET "M1" is high, the divided voltage inputted to the cathode of the shunt regulator "D1" is also high. If the divided voltage is higher than the reference voltage of the shunt regulator "D1," electric currents occur between the anode and cathode of the shunt regulator "D1" and through the base of the transistor "T3." Then, electric currents occur between the collector and emitter of the transistor "T3" and through the base of the transistor "T2" whose base is connected to the collector. In this regard, the resistance between the collector and emitter of the transistor "T2" is reduced, the gate voltage of the MOSFET "M1" is pulled into the ground, and the ground voltage is reduced. Accordingly, the power supply is not given between the drain and source of the MOSFET "M1," the source voltage of the MOSFET "M1" is reduced, and the voltage of the $V_{scan}$ power source is reduced.

As described above, when the source voltage of the MOSFET "M1" is high, by reducing the gate voltage of the MOSFET "M1," the source voltage of the MOSFET "M1" can be reduced. On the other hand, if the source voltage of the MOSFET "M1" is low, the shunt regulator "D1" is not turned on. Therefore, electric currents do not occur through the bases of the transistors "T3" and "T4," keeping the gate voltage of the MOSFET "M1" high. Namely, the transistors "T3" and "T4" reversely input the source voltage of the MOSFET "M1" to the gate of the MOSFET "M1," achieving feedback control by which when the source voltage of the MOSFET "M1" is high, the source voltage of the MOSFET "M1" is reduced and when the source voltage of the MOSFET "M1" is low, the source voltage of the MOSFET "M1" is increased. In this sense, the transistors "T3" and "T4" are equivalent to the "regulating transistor" of the present invention.

Further, the divided voltage to the cathode of the shunt regulator "D1" can be changed by adjusting the variable resistor "R1." Therefore, adjustment of the variable resistor "R1" facilitates the divided voltage to exceed the reference voltage of the shunt regulator "D1" or makes it difficult for the divided voltage to exceed the reference voltage of the shunt regulator "D1." Namely, by adjusting the variable resistor "R1," the ratio in terms of time in which the gate voltage of the MOSFET "M1" is pulled into the ground can be adjusted, and the voltage of the $V_{scan}$ power supply can be adjusted.

In the present embodiment, the variable resistor "R1" is adjusted so that the $V_{scan}$ power supply outputted to the plasmas display panel 11 as a secondary power supply will close in on 175 V. In the voltage-regulator circuits 30b and 30c, the variable resistor is adjusted so that the voltages of the $V_e$ power supply and $V_{scan}$ power supply, which are outputted as secondary power supplies to the plasma display panel 11, will be 65 V and −220 V, respectively. Thus, the $V_{set}$, $V_e$, and $V_{scan}$ power supplies, which can be used by the plasma display panel 11 as secondary power supplies, are derived when the voltage-regulator circuits 30a, 30b, and 30c stabilize the voltages of the inputted secondary power supplies $V_{sub1}$, $V_{sub2}$, and $V_{sub3}$ at any desired levels. At the voltage-regulator circuits 30a, 30b, and 30c, the voltages of the $V_{set}$, $V_e$, and $V_{scan}$ power supplies to be outputted can be adjusted by adjusting the variable resistor. Therefore, the plasma television set of the present invention can flexibly cope with the changes of specifications of power supplies of its plasma display panel 11.

(4) Summary

As described above, according to the present invention, at the primary power-supply board 40, the $V_{sus}$ power supply and $V_{add}$ power supply of prescribed voltages are derived and outputted to the plasma display panel 11. The secondary power supplies $V_{sub1}$, $V_{sub2}$, and $V_{sub3}$ are derived from prescribed voltage levels of the transformer 42 for deriving the $V_{sus}$ and $V_{add}$ power supplies at the primary power-supply board 40. The secondary power supplies $V_{sub1}$, $V_{sub2}$, and $V_{sub3}$ are outputted to the secondary power-supply board 20 which is a board different from the primary power-supply board 40. At the secondary power-supply board 20, $V_{set}$, $V_e$, and $V_{scan}$ power supplies which can be used by the plasma display panel 11 are derived by regulating the secondary power supplies $V_{sub1}$, $V_{sub2}$, and $V_{sub3}$. Thus, since the primary power-supply board 40 and the secondary power-supply board 20 are provided separately, the secondary power-supply board 20 alone can be replaced, which makes it possible to flexibly cope with the changes of specifications of power supplies of the plasma display panel 11.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

What is claimed is:

1. A plasma television set having a plasma display panel driven by a plurality of direct-current power supplies including at least an address power supply and a sustain power supply, said plasma television set comprising a primary power-supply board and a secondary power-supply board, said primary power-supply board including:
a rectifier circuit for converting an alternating-current power supply to an direct-current power supply;
a transformer for deriving address and sustaining power supplies of prescribed voltages from said direct-current power supply;
primary power-supply board output terminals for outputting said address and sustaining power supplies to said plasma display panel; and
terminals for the secondary power-supply board for outputting secondary power supplies derived from prescribed voltage levels of said transformer to the secondary power-supply board, said secondary power-supply board being independent of said primary power-supply board and including:
input terminals connectable to said terminals for the secondary power-supply board;
MOSFETs which are fed with said secondary power supplies through their drains and output said secondary power supplies through their sources to said plasma display panel;
capacitors put between the source and the grounds of said MOSFETs;
variable resistors put between the sources and the grounds of said MOSFETs;
shunt regulators into which divided voltages from the voltages of said secondary power supplies divided by said variable resistors are inputted as reference voltages;
regulating transistors which reduce the gate voltages of said MOSFETs when said shunt regulators are turned on;
starting transistors which a start signal outputted from a microcomputer is inputted into and reduce said gate voltages while no start signal is inputted into them;
limiting transistors which reduce said gate voltages if overcurrents are detected at the sources of said MOSFETs; and
secondary power-supply board output terminals for electrically connecting the sources of said MOSFETs to said plasma display panel.

2. A plasma television set having a plasma display panel driven by a plurality of direct-current power supplies including at least an address power supply and a sustain power supply, said plasma television set comprising a primary power-supply board and a secondary power-supply board, said primary power-supply board including:
a rectifier circuit for converting an alternating-current power supply to a direct-current power supply;
a transformer for deriving address and sustaining power supplies of prescribed voltages from said direct-current power supply,
primary power-supply board output terminals for outputting said address and sustaining power supplies to said plasma display panel; and
terminals for the secondary power-supply board for outputting secondary power supplies derived from prescribed voltage levels of said transformer to the secondary power-supply board, said secondary power-supply board being independent of said primary power-supply board and including:
voltage-regulator circuits for regulating said secondary power supplies inputted through said terminals for the secondary power-supply board and outputting them to said plasma display panel.

3. A plasma television set according to claim 2, wherein said voltage-regulator circuit includes:
a MOSFET which is fed with said secondary power supply through its drain and outputs said secondary power supply through its source to said plasma display panel;
a capacitor put between the source and the ground of said MOSFET;
a variable resistor put between the source and the ground of said MOSFET;
a shunt regulator into which a divided voltage from the voltage of said secondary power supply divided by said variable resistor is inputted as a reference voltage; and
a regulating transistor which reduces the gate voltage of said MOSFET when said shunt regulator is turned on.

4. A plasma television set according to claim 3, wherein each of said voltage-regulator circuits includes a starting transistor which a start signal inputted from a microcomputer is inputted into and reduces said gate voltage while no start signal is inputted into it.

5. A plasma television set according to claim 4, wherein each of said voltage-regulator circuits includes a limiting transistor which reduces said gate voltage if an overcurrent is detected at the source of said MOSFET.

* * * * *